United States Patent [19]

Reed et al.

[11] 4,034,803

[45] July 12, 1977

[54] CORROSION RESISTANT TUBULAR AIR PREHEATER

[75] Inventors: Robert D. Reed; Wallace F. Hart, both of Tulsa, Okla.

[73] Assignee: John Zink Company, Tulsa, Okla.

[21] Appl. No.: 598,782

[22] Filed: July 24, 1975

[51] Int. Cl.² .................................. F28F 19/00
[52] U.S. Cl. ........................... 165/103; 165/135; 165/134; 165/157; 165/DIG. 2; 237/12.3 A
[58] Field of Search .......... 165/103, 134, 135, 157, 165/DIG. 2, 160, 161; 126/110 R, 117, 109, 106, 103; 237/12.3 A

[56] References Cited

U.S. PATENT DOCUMENTS

| | | | |
|---|---|---|---|
| 1,834,398 | 12/1931 | Harter | 165/160 X |
| 1,914,415 | 6/1933 | Farbridge | 126/109 |
| 2,202,920 | 6/1940 | Potter | 237/12.3 A |
| 2,521,866 | 9/1950 | Ott | 165/103 X |

Primary Examiner—Albert W. Davis, Jr.
Attorney, Agent, or Firm—Head, Johnson & Chafin

[57] ABSTRACT

A corrosion resistant tubular air preheater in which combustion air is heated by heat transfer from flue gases from a furnace. The heat exchanger is of a longitudinal type having a central enclosure of rectangular cross-section in which a plurality of tubular heat transfer elements are mounted. Surrounding the central enclosure is an outer plenum. Cold combustion air enters at the bottom of the outer plenum and circulates around and up the plenum to a series of openings on top of the heat transfer elements. The partially heated combustion air then passes downwardly through metal tubes in the heat transfer elements and then passes outwardly to the furnace. The minimum temperature in metal structure enclosing the combustion gases is controlled by two means. One is the use of insulation in selected areas to limit heat transfer rate to cold air impinging upon metal surfaces. The second method is by control of cold air flow incidence on or along heat transfer surfaces so as to minimize rapid heat transfer from any metal surface, which might chill the surface below the dew point.

10 Claims, 4 Drawing Figures

CORROSION RESISTANT TUBULAR AIR PREHEATER

BACKGROUND OF THE INVENTION

This invention lies in the field of heat transfer apparatus. More particularly, it concerns gas to gas heat transfer apparatus.

Still more particularly, this apparatus is concerned with heat transfer from hot flue gases, particularly those that may contain sulfur oxides, to cold air to be used for combustion purposes. The particular factors involved concern the design of the apparatus to prevent cooling any part of the metal surfaces below the dew point of the flue gases, particularly when containing sulfur trioxide, so as to avoid corrosion troubles.

In the prior art, there have been many designs of gas to gas heat exchange devices. However, because of the importance of energy conservation at the present time, and because of the necessity of using fuels that contain sulfur, and the importance of reducing the corrosion which results when sulfur trioxide-containing flue gases are cooled below the dew point, various features of this invention will obviate many of the difficulties previously experienced in equipment of this sort because of the corrosion due to sulfuric acid formed when $SO_3$ reached dew point temperature in the presence of water vapor.

SUMMARY OF THE INVENTION

In the art of combustion of fuels, where air must be supplied as a source of oxygen for the combustion chemical reactions regardless of fuel, as preferred technique for fuel (heat energy) conservation is that which provides recovery of heat from gases residual from combustion (and enroute to the chimney) for preheating the supply of air for combustion. Heat content of chimney-bound gases is lost heat otherwise.

Reason is that as a quantity of heat (energy) is added to combustion air, the quantity of heat thus recovered substracts from the total fuel heat required for performance of a function for which heat is required. This is to say that, if the heat demand for a function is 10,000,000 btu/hr and if 1,000,000 btu/hr is added to the air for combustion, the fuel demand to satisfy the function is for but 9,000,000 btu/hr rather than for 10,000,000 btu/hr. Thus there is conservation of 10% of fuels which are typically fossil-derived.

Combustion air preheat is typically the means adopted for fuel conservation when air preheater corrosion is not a deterrent to such practice. Preheater corrosion becomes a factor when the fuel contains sulfur. This is because as much as 5 weight-percent of the sulfur burned occurs in the residual combustion gases as $SO_3$ and not as $SO_2$. The $SO_3$ is the anhydride of sulfuric acid so as it reaches dew point temperature in the presence of water vapor, it becomes sulfuric acid, which is highly corrosive and attacks metals with great rapidity at temperature typical of heat recovery through combustion air preheat. It is not at all uncommon for tubular air preheaters to be destroyed in four weeks or less by such corrosion.

A greatly preferred type of air preheater is one which is tubular, but the tubular air preheater has the great disadvantage of being prone to sulfuric corrosion as a typical thing. It is particularly prone to corrosion because areas within it allow very high heat transfer rates to exist and high heat transfer rates cause chilling of air heater metal parts to cause $SO_3$ dew point to occur when significant partial-pressure of water vapor is present. In this case, the combustion gases are the heat-medium and air for combustion is the heat-sink. With typical fuel oil and at 25% excess air, the water vapor partial pressure is 11.7% and with typical natural gas at 25% excess air, the partial pressure of water vapor is 15.3%. Both fuels can contain appreciable sulfur weight-percent, as also can process-derived fuel gases, where a mean water partial pressure in residual combustion products is in the order of 13%.

As combustion gas dew point is considered, there are factors of interest. The first is dew point temperature due to water vapor only; a second is the effect on dew point temperature when both $SO_3$ and water vapor are present. A very undesirable $SO_3$ characteristic is that its presence, even as parts-per-million, greatly increases dew point temperature above that for water vapor only. This has been shown in many researches but there is not precise agreement as to dew point temperatures (specific) for cases as reported.

In the following table dew point temperatures are shown which are experience-proven to be reasonably correct. These are given for three values of partial pressure of water vapor.

| $H_2O$ Only | EFFECT OF PARTS-PER-MILLION (PPM) OF $SO_3$ | | | | |
|---|---|---|---|---|---|
| | 5 PPM $SO_3$ | 10 PPM $SO_3$ | 20 PPM $SO_3$ | 50 PPM $SO_3$ | 100 PPM $SO_3$ |
| 10.5% - 116 F | 156 F | 186 F | 212 F | 244 F | 272 F |
| 13.1% - 124 F | 164 F | 194 F | 220 F | 252 F | 277 F |
| 15.8% - 130 F | 179 F | 198 F | 224 F | 254 F | 280 F |

Heat transfer is by convection in tubular air preheaters where a metal surface receives heat from a heat-medium (combustion). Radiant heat transfer factors are only microscopically present in heat transfer from a surface to air. In convected heat transfer, the degree of magnitude of heat transfer is governed by respective flow factors in relation to their state of flow as well as direction of flow; also to whether the gas flow is turbulent or laminar (see Heat Transmission; McAdams; McGraw-Hill). The limitation that laminar flow is said to exist when the flow Reynold's Number is less than 3,000 and turbulent flow when the Reynold's Number is greater than 3,000, is generally accepted by engineers.

Flow velocity is a factor in Reynold's Number calculation, such that as flow velocity increases the Reynold's Number also increases. The Reynold's Number of flow is a governing factor for heat transfer because as the Reynold's Number increases the quantity of heat transferred from a surface over which the flow is occuring also increases. Consider a fixed quantity of heat delivered to a metallic surface by flow of the heat-medium over the metallic surface. If no heat is transferred to the heat-sink, the temperature of the metal will reach quite close to that of the heat-medium. As heat is delivered by the metal surface to the heat-sink, the temperature of the metallic surface will fall to a temperature level below that of the heat-medium. Thus the rate at which heat can be transferred from the metal to the heat-sink determines the minimum temperature which can exist. If the metal temperature is caused to drop to a figure at which dew point can occur, sulfuric corrosion of the metal immediately begins. Metal temperature must always be greater than the dew point temperature due to the presence of $SO_3$ if corrosion is to be avoided, and, on the other hand, provision of high metal temperature is evidence of restricted heat transfer potential.

In the art of gas-to-gas heat transfer (which is the case in air preheat) there are generally accepted precepts for design. Maximum heat transfer occurs when there is direct turbulent impact (collision) at 90°, of heat-sink on a metallic surface. There is less heat transfer as the state of turbulence in collision is reduced. Lesser heat is transferred from the metallic surface as there is turbulent flow of heat-sink and the direction of heat-sink flow is co-current with the heat medium flow, where both flows are parallel to the metallic surface. Also, the state of turbulence (Reynold's Number) of the flows is a controlling factor in that reduction of turbulence reduces heat transfer. Still further, reduction in heat transfer occurs when both the heat-medium and the heat-sink flow co-currently, and least heat transfer occurs in co-current flow where flow Reynold's Numbers are low.

Those who are versed in the art of gas-to-gas heat transfer are aware of the factors just discussed, but to the best of knowledge, prior art does not incorporate structural design elements which regulate the degree of heat transfer in critical areas of tubular air preheaters, to permit corrosion-free operation when sulfur containing fuels provide the heat-medium, and where optimum heat is to be recovered.

It is the primary object of the invention to provide a heat transfer apparatus for transferring the heat from the effluent from a furnace which may be burning fuels containing sulfur, so that there will be no dew point of sulfur oxides and, therfore, a minimum or corrosion. This is accomplished in areas where the heat transfer rate is potentially high by providing insulation to control the heat transfer at localized points to a selected value, and by controlling flow of the cold gases so as to prevent over-cooling, and therefore, condensation of the sulfur oxides.

These and other objects are realized and the limitations of the prior art are overcome in this invention by providing a heat exchanger which has an internal structure in which there is, initially, co-current flow of heat-medium and heat-sink plus flow velocity reduction of the heat-sink, followed by counter-current flow of heat-medium with heat-sink along with acceleration of heat-sink flow along with insulation of critical areas. There is a rectangular metal wall surrounding the flue gas flow, and further heat transfer contact is provided by the flow of cool air around the outside of the central wall in a plenum which is enclosed within a second rectangular enclosure. The cool air enters at the lower end of the enclosure, passes into the annular space of the plenum and around and upward, at reduced velocity, to the tops of a plurality of heat transfer elements which have vertical tubes through which the air flow is downward, with upwardly flowing hot gas contact on the outside of the tubes.

The lower portion of the central wall is covered with thermal insulation, adequate to stand the temperature of the metal wall having the hot gas contact on the inside. There is also insulation applied to the closure ends of the heat transfer elements which are in a position to receive the flow if only partially heated air by perpendicular impact. Since such impingement of only partially heated air on the metal surfaces might cool those particular parts to a temperature below the dew point, they are protected by insulations.

The air flow and hot gas flow are both upward in the first portion of the air flow, and then counter-current in the second portion of the air flow so that the warmed air exits from the bottom of the heat exchanger, and the flue gases pass through the central enclosure of the transfer apparatus to the stack.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
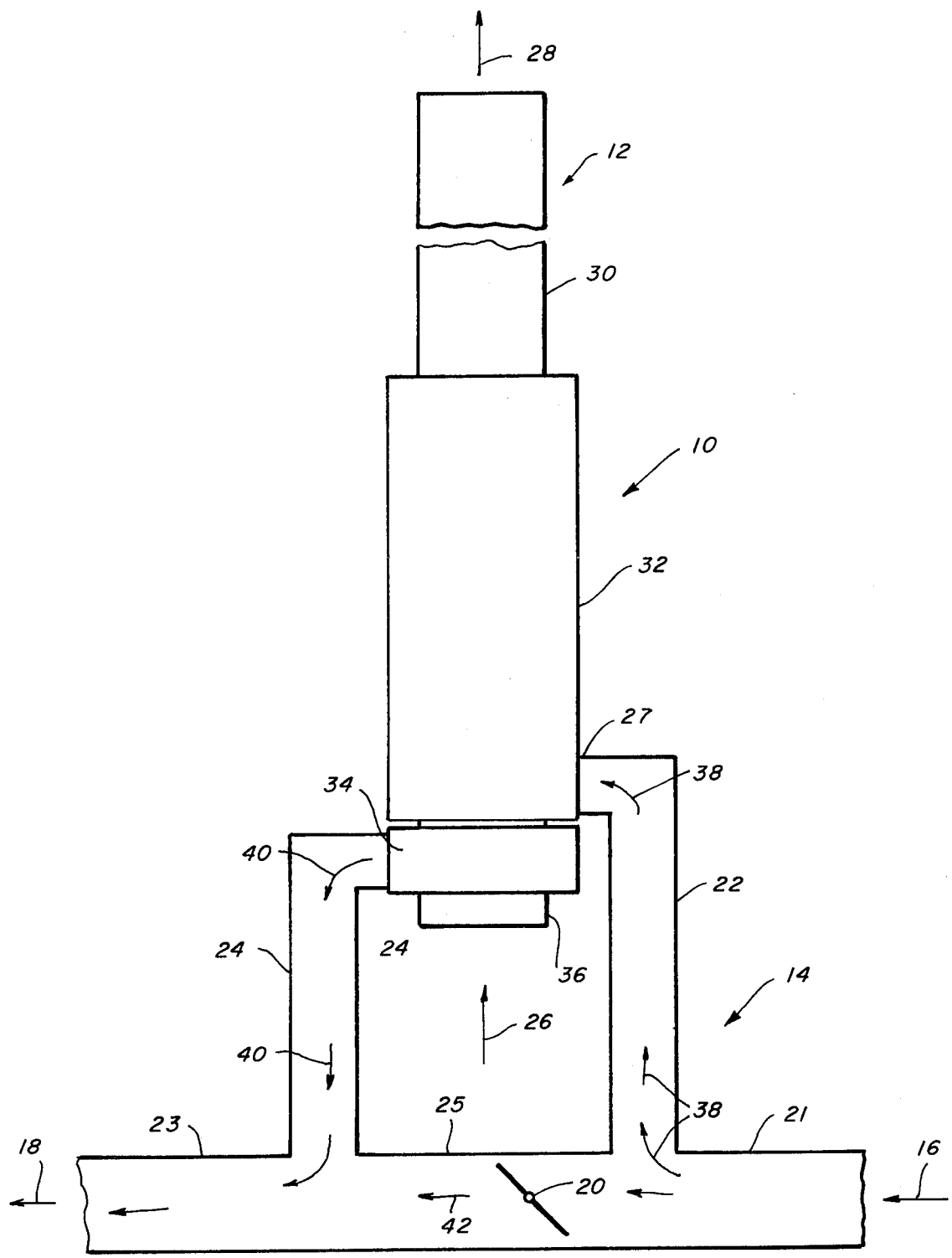
FIG. 1 represents an overall view of the heat exchanger, the inlet from the furnace, the outlet to the stack, and the combustion air conduits.

Referring now to the drawings and in particular to FIG. 1, there is shown a generalized view of the apparatus of this invention, in conjunction with the flow of flue gas from a furnace to a stack, and a flow of cool air into and through the heat exchange apparatus and to the combustion entrance of the furnace.

Numeral 10 indicates generally the heat transfer apparatus. Numeral 12 indicates the stack or chimney. Numeral 14 indicates the combustion air conduits.

The flue gases, indicated by the arrow 26, flows into the bottom of the heat exchange apparatus 10 through conduit 36, passes up through the heat exchanger 32 and into the stack 30, and after being cooled, exits to the atmosphere in accordance with arrow 28. Cool air for combustion purposes in the furnace (not shown), enters conduit 21 in accordance with arrow 16. There is a damper, or butterfly valve, 20, in the conduit portion 25, which can control the flow of cool air in accordance with arrow 42, which passes directly from the inlet conduit 21 to the outlet conduit 23. Normally most, if not all, of the entering air 16 will pass upward in accordance with arrows 38 through conduit 22 and into the heat exchange unit through inlet 27. The outlet of warmed combustion air passes through the outlet 34 and conduit 24 in accordance with arrows 40, and into the portion 23 of the combustion air conduit, and out in accordance with arrow 18 to the furnace.

As will be explained later in the description, the flow of cooling air is controlled so that dependent upon the temperature of the air, and the amount of sulfur in the fuel, there will be no cooling of the metal parts of the heat exchanger in contact with the flue gases, below the dew point of the gas containing sulfur trioxide, so that there will be no condensation of sulfur trioxide and water, which will form a very corrosive liquid, and seriously will injure the metal parts of the heat exchange system. The bypass 25 which permits entering air 16 to pass directly through the conduit 25 to the outlet 23, is controlled by the damper 20.

Figure 2:
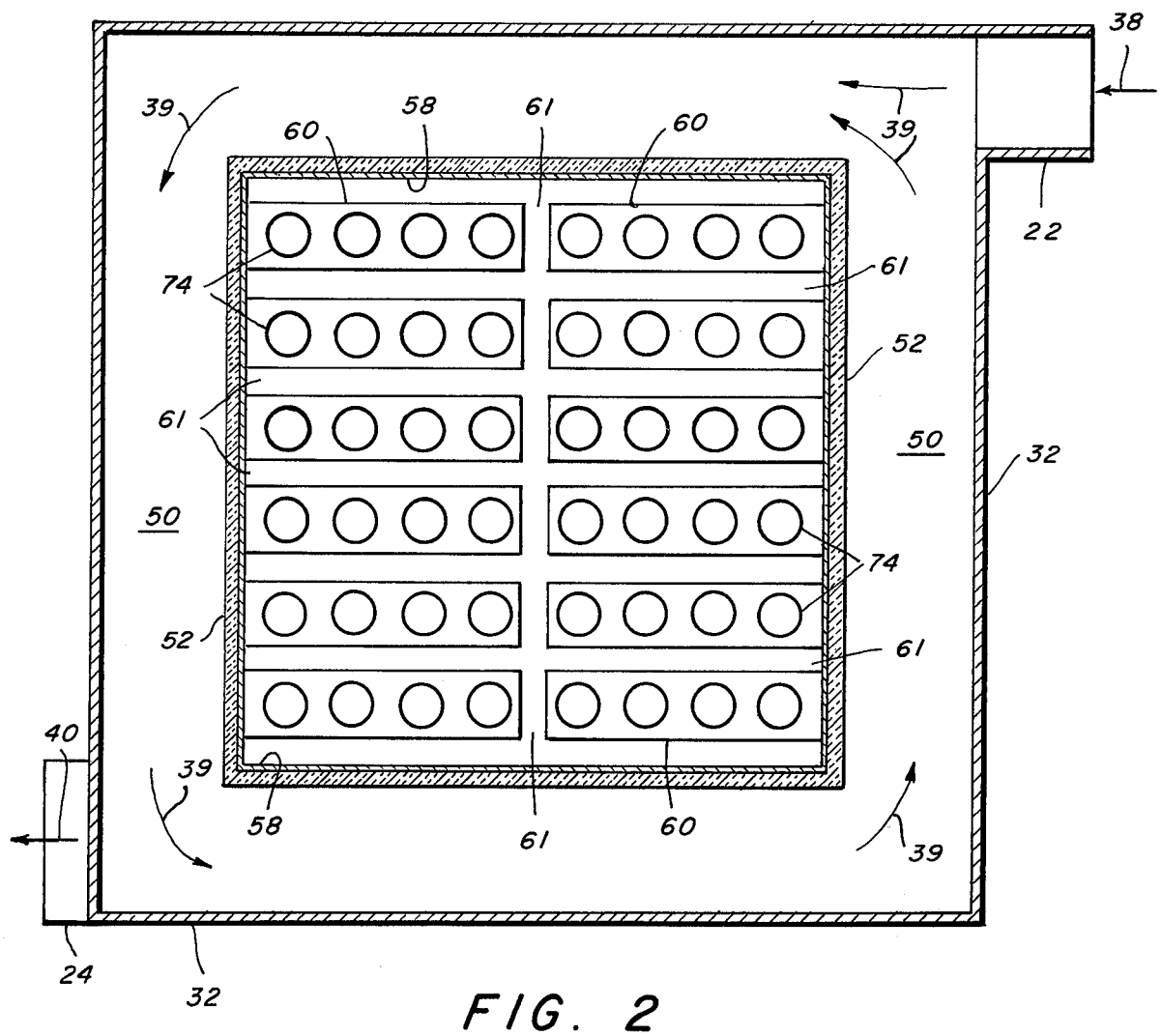
FIG. 2 represents a horizontal cross-section of the heat exchanged apparatus along the plane 2—2 of FIG. 4.
Figure 4:
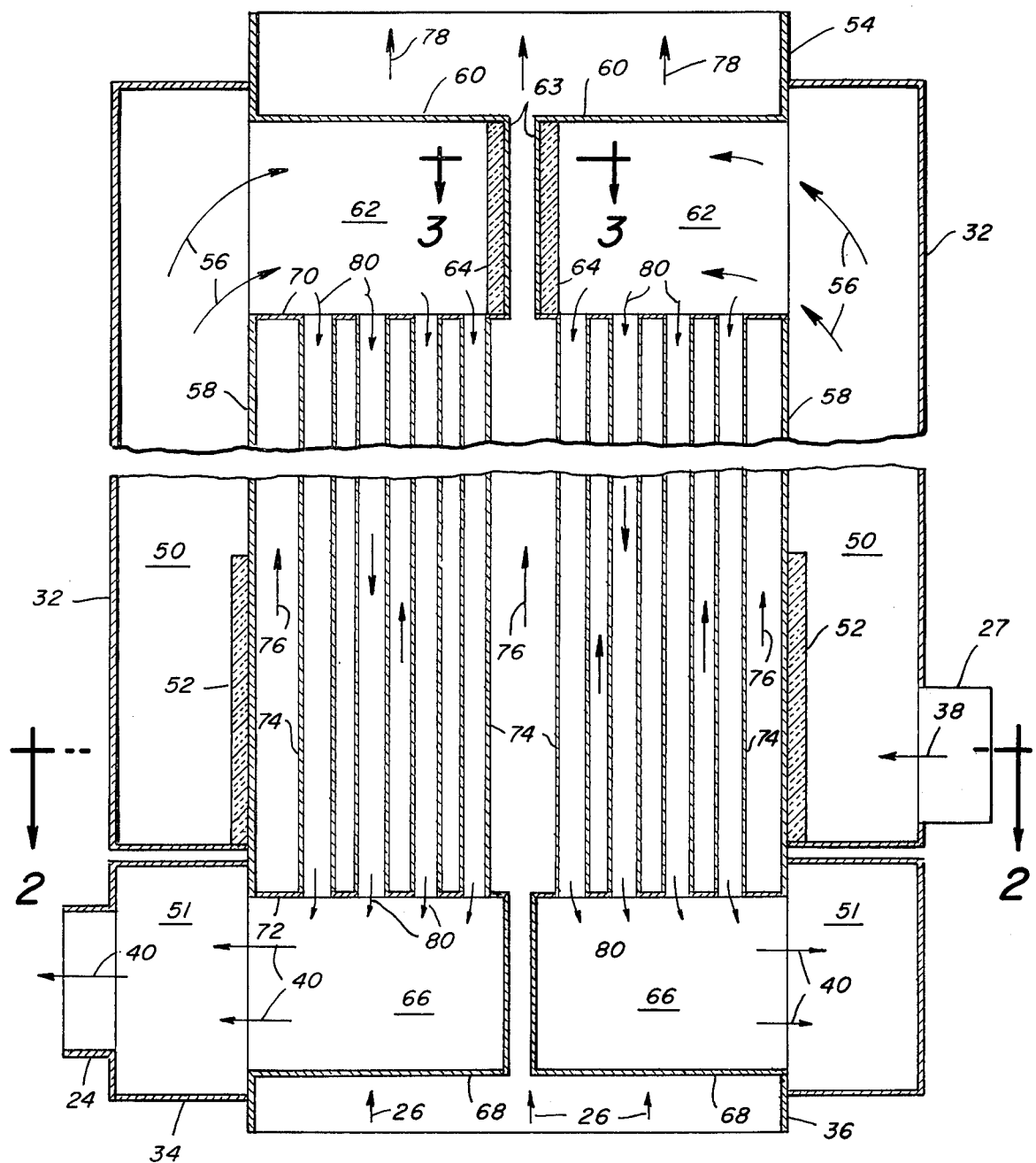
FIG. 4 illustrates a vertical cross-section through the heat exchange apparatus.

Referring now to FIGS. 4 and 2, the heat exchange system comprises an interior rectangular metal structure or wall 58, through which the flue gases flow in accordance with arrows 26, 76, 78 after entering through the opening 36 at the bottom of the heat exchanger. Inserted inside of the rectangular conduit 58, which encloses the hot flue gases, are a plurality of heat exchange elements 60, which are of thin rectangular cross-section and contain an upper and lower plenum 62 and 66, respectively. They have an upper tube sheet 70 and a lower tube sheet 72 into which are sealed a plurality of vertical thin walled tubes 74. The upper and lower plena 62 and 66 are inserted into the wall 58.

Surrounding the rectangular conduit and central wall 58 is an outer rectangular metal housing 32 which forms a plenum 50 which completely surrounds the wall 58 of the flue gas conduit.

The cool air enters the plenum 50 in accordance with arrow 38 through the entrance conduit 27. This is tangential to the wall of the central enclosure 58. The cool air circulates through the plenum 50 in accordance with arrows 39, and moves upward in accordance with arrows 56, after entrance velocity loss, and enters the upper plenum 62 of the heat exchange element 60. The air then turns downward in accordance with arrows 80, and passes downward through the tubes 74 of the heat exchange elements 60, and into the lower plena 66 which face outwardly into an outlet air plenum 51. The flow from the plena 66 in accordance with arrows 40 then passes through the plenum 51 and out through the exit conduit 24 in accordance with arrow 40.

The hot flue gases 26 pass up as arrows 76 through the spaces 61 between the heat transfer elements 60, and in the spaces between the tubes 74 of the heat exchange elements 60. Wall 58 and the tubes 74 are heated by contact with the flue gases. The air flow on the outside of the wall 58 and inside of the tubes 74, against which the cool air flows, picks up heat and cools the walls. There should be as rapid and as turbulent a flow of air as necessary in 74 in order to pick as much heat as possible from the metal surfaces. However, as explained earlier in the description, if there is sulfur trioxide present in the flue gas the normal dew point of water vapor is raised by the presence of the sulfur trioxide, and if the temperature of the metal surface at any point drops below the dew point, then the sulfur trioxide will condense as sulfuric acid and will cause corrosion. Consequently, in those portions of the metal surface where there is the highest rate of contact of the cool air against the hot metal surfaces, the heat transfer from the metal surface is reduced by placement of suitable insulation such as the sheets 52 on the outside of the wall 58, particularly at the lower lever, where the turbulent inlet flow takes place.

By design, the cross-sectional area of the plenum 50 for flow of air is approximately six times the cross-sectional area of the inlet conduit 22. Consequently, while the Reynold's Number of the air flow 38 may be high, and heat transfer from the wall 52 to the air would be high, the presence of the insulation 52 reduces that heat transfer to the point where the wall 58 opposite the inlet air is protected from too high a rate of heat loss and super cooling.

As the air moves into the plenum 50, its velocity decreases in accordance with a broadening of the flow area, and therefore, the insulation 52 is not needed at the upper portion of the wall 58 because air and combustion gases are flowing co-currently at low Reynold's Number to greatly restrict heat transfer.

The partially warmed air then is directed in accordance with arrows 56 into the plena 62, and must be turned downward in accordance with arrows 80 to enter the pipes 74. However, the direct impingement of the air 56 onto the walls 63 at the end of the plena 62 would provide another area of excess cooling, and therefore, these walls must be protected by insulation 64.

The air flow is turned downward into the pipes 74, and the partially warmed air 80 then makes proper contact with a higher Reynold's Number and better heat transfer, through the walls of the pipes 74, to the hot flue gases. This flow is counter to the flue gas flow, so that the exiting air into the lower plena 66 is as high as can be obtained, because it is in contact with the hottest flue gas. The heated air then follows in accordance with arrows 40 out of the outlet pipe 24 and to the exit conduit 23 and to the furnace.

Figure 3:
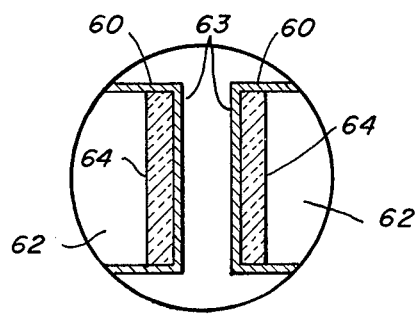
FIG. 3 illustrates in cross-section a portion of FIG. 2, along the plane 3—3 of FIG. 4.

FIG. 4 and FIG. 3, which illustrate a view of the heat exchange elements across the plane 3—3 of FIG. 4, show the placement of the insulation 64 against the walls 63 in the ends of the plena 62.

In developing the design of apparatus illustrated, two factors have been used to control the rate of heat transfer so as not to be excessive. This is done by controlling the velocity of flow of the air, and correspondingly its Reynold's Number, so as to provide a degree of turbulent flow such that can be tolerated without cooling the metal parts below the dew point. In those portions of the equipment where there is direct impingement and turbulent contact between the air and the metal surfaces, these are protected by insulation. A third means of control is to bypass a selected portion of the cool air as shown in FIG. 1 so that the total flow through the heat exchanger can be controlled to the point where there is not excess cooling and condensation of the sulfur oxides.

While the air preheater of this invention has been described as of rectangular construction, it will be evident that the inner and outer walls can be of other cylindrical cross-section, such as hexagonal, octagonal, circular, etc., with the internal heat transfer elements of corresponding cross-sectional shapes.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

We claim:

1. A corrosion resistant tubular air preheater for transfer of heat from hot flue gases carrying corrosive vapors, without condensing said corrosive vapors, comprising:
   a. an inner vertical cylindrical metal conduit or wall, for the upward flow of hot flue gas;
   b. an outer vertical cylindrical metal wall of the same cross-section shape as said inner wall spaced outwardly from said inner wall forming an annular air inlet plenum;
c. a plurality of heat transfer elements and surfaces, including elements of narrow cross-section and including a plurality of vertical thin wall metal tubes connected between upper and lower plena;
d. said heat transfer elements inserted inside said inner wall with said upper plena connected to the top of said inlet plenum through said inner wall to an outlet plenum surrounding said inner wall below said inlet plenum;
e. inlet air conduit means connected to the bottom of said inlet plenum;
f. outlet air conduit means connected to said outlet plenum;
g. bypass means to control the flow velocity of cold air through said air preheater; and
h. thermal insulation covering selected portions of the heat transfer surfaces where condensation and corrosion is likely to occur;
whereby the cooling of said flue gases below the dew point of said corrosive vapors in the presence of water vapor is prevented.

2. The air preheater as in claim 1 in which said thermal insulation cover at least the lower portion of said inner wall inside said air inlet plenum in the region of said inlet air conduit.

3. The air preheater as in claim 2 in which said thermal insulation covers at least portions of the walls of said upper plena subject to direct impingement of cool air.

4. The air preheater as in claim 1 in which said bypass means comprises bypass conduit means between said inlet air conduit and said outlet air conduit, and control means to control the flow of air through said by-pass conduit means.

5. The air preheater as in claim 1 including means to introduce cold inlet air into the lower end of said inlet air plenum tangential to one wall of said inner wall.

6. The air preheater as in claim 1 in which said corrosive vapors comprise sulfur oxides in the presence of water vapor.

7. The air preheater as in claim 1 in which the cross-sectional shape of said inner and outer walls is rectangular, and said elements are of rectangular cross-section, and said cold air inflow in tangent to one wall of said inner wall.

8. The air preheater as in claim 1 in which said air inlet plenum has a cross-sectional area approximately four times that of said inlet air conduit.

9. The air preheater as in claim 1 in which said inlet air flow in said inlet plenum is co-directional, and in said heat transfer elements is counter-directional to the flow of said hot flue gases.

10. A corrosion tubular air preheater for transfer of heat from hot flue gases carrying corrosive sulfur oxides in the presence of water vapor without condensing said sulfur oxides, comprising:
a. an inner vertical cylindrical metal conduit or wall of the upward flow of hot flue gas;
b. an outer vertical cylindrical metal wall spaced outwardly from said inner wall forming an annular air inlet plenum;
c. a plurality of cylindrical heat transfer elements, each having a plurality of vertical thin wall metal tubes connected between upper and lower plena;
d. said heat transfer elements inserted inside said inner wall with said upper plena connected to the top of said inlet plenum through said inner wall, and said lower plena connecting through said inner wall to an outlet plenum surrounding said inner wall below said inlet plenum;
e. inlet air conduit means connected to the bottom of said inlet plenum;
f. outlet air conduit means connected to said outlet plenum;
g. bypass means to control the flow velocity of cold air through said air preheater; and
h. thermal insulation covering selected portions of the heat transfer surfaces subject to direct impingement of cold air;
whereby the cooling of said flue gases on the inner surfaces of said heat transfer surfaces, below the dew point of said sulfur oxides and water vapor is prevented.

* * * * *